United States Patent Office 3,157,691
Patented Nov. 17, 1964

3,157,691
PREPARATION OF AROMATIC POLYCARBOXYLATED COMPOUNDS
Willis C. Keith, Lansing, Ill., assignor to Sinclair Refining Company, New York, N.Y., a corporation of Maine
No Drawing. Filed Oct. 20, 1958, Ser. No. 768,016
9 Claims. (Cl. 260—475)

This invention is drawn to a process for production of aromatic polycarboxylated compounds. More particularly, this invention is concerned with the liquid phase oxidation of alkyl substituted benzene carboxylic acid esters having at least one carboxyl ester radical and at least one alkyl radical attached to the aromatic nucleus while in the presence of molecular oxygen, a catalytic amount of hydrogen bromide and a material which apparently acts as a solvent for the reactants.

Most prior art processes for the production of benzene polycarboxylic acid esters have esterified the free acid which is conventionally produced from an alkyl benzene. numerous methods have been attempted to bring about the oxidation of alkyl substituted aromatics, such as the xylenes, to their corresponding polycarboxylic aromatic acids with varying degrees of success. For example, an article appearing in Industrial and Engineering Chemistry, vol. 41, No. 11, page 2615 entitled "Oxidation of Aromatic Compounds" discloses a method for effecting the liquid phase oxidation of alkyl aromatics in the presence of hydrogen bromide. The oxidation process described therein is conducted in the absence of a solvent and the acid product is substantially contaminated with various impurities such as brominated reaction products. The patent to Rust et al. U.S. 2,415,800, also discloses the oxidation of alkyl aromatics while in the presence of hydrogen bromide. In this patent the oxidation is generally carried out in the vapor phase and in the absence of a solvent. The hydrogen bromide apparently acts as an inhibitor to retard the decomposition of the hydrocarbon feedstock, so that the oxidation products have the same number of carbon atoms as the feedstock. Another oxidation procedure is described in Australian patent specification 16,742,/56, and in this method a metal bromide catalyst is employed.

In accordance with the present invention I have found that good yields of desired polycarboxylated compounds can be obtained if a feedstock consisting essentially of an alkyl substituted benzene carboxylic acid ester is oxidized in the liquid phase with a free oxygen-containing gas at elevated temperatures of about 150° C. to 350° C. and pressures sufficient to maintain the liquid phase while in the presence of catalytic amounts of hydrogen bromide and a particular material which substantially solubilizes the feedstock. In many instances, the conversion of the feedstock can be as high as 100% or substantially quantitative. The polycarboxylic materials so produced, e.g. acids and esters, can be used as such in processes for producing polyester and alkyd resins which find use as synthetic fibers and paint bases and viscosity improvers for lubricant compositions. Such resins may be produced by an ester interchange reaction with a glycol, etc. The esters produced by the process of this invention may also be easily converted to the free acid or salt as by hydrolysis or neutralization. The use of alkyl-substituted benzene compounds containing at least one esterified carboxyl radical in the molecule as a feedstock in the oxidation reaction avoids the formation of undesirable by-products.

This invention is primarily concerned with the oxidation of toluic acid esters to phthalic acid and phthalic acid esters, although aromatic compounds containing one or more lower alkyl substituents are included within the scope of this invention. The alkyl substituents will generally contain 1-4 carbon atoms, and at least one of the alkyl groups must be non-tertiary, that is, other than t-butyl, since this side chain is not oxidized by the process of this invention. The aromatic acid ester feedstock to be oxidized can contain only one alkyl radical or it can contain a plurality of such radicals, if desired, and also the presence of the esterified carboxyl radical need not be limited to one but a plurality thereof can be provided. Thus, the feedstock can contain from one to five alkyl groups and one to five esterified carboxyl groups but, of course, the alkyl and carboxyl groups total not more than six. Moreover, the ring may also have other substituents such as chlorine or bromine which may or may not be susceptible to oxidation by this process. The ester substituent may be the residue of an alcohol having 1–4 carbon atoms. The methyl ester is preferred. Representative esters which can be oxidized in accordance with the process of this invention can be enumerated as follows: methyl, ethyl or isopropyl toluate, the methyl ester of dimethyl benzoic acid, ethyl durylate, etc., or a combination of esters of this type.

The feedstocks for the present invention can be prepared in a number of different ways. For example, an alkyl substituted benzene such as xylene can be conveniently oxidized to toluic acid in the presence of molecular oxygen by the use of a catalyst such as cobalt toluate, cobalt naphthenate, etc. under elevated temperatures and pressures with the mechanism of the reaction being controlled so as to produce predominantly toluic acids. The other partially carboxylated alkyl substituted aromatic acids can be derived by similar procedures from their corersponding alkyl substituted benzenes. Esterification is preformed by heating together the acid with an equimolar amount of the desired alcohol, preferably in the presence of an esterification catalyst such as p-toluene sulfonic acid.

The material which I use to catalyze my oxidation reaction is hydrogen bromide and it can be introduced as such into the system or it can be formed in situ during the course of the reaction. For instance, I can introduce materials such as free bromine, alkyl bromides, hypobromous acid, etc. into the system and under the reaction conditions they will yield hydrogen bromide. The amount of hydrogen bromide provided in the system will be sufficient to catalyze the reaction and can vary over a wide range with no particular limits being critical. The catalyst is effective in the absence of catalytic metals such as cobalt. The hydrogen bromide is used preferably as an aqueous solution containing about 30–60% HBr. The quantity of catalyst is usually varied from about 0.01 mole to 10 mole per 10 moles of aromatic feed. The preferred amount of catalyst is from about 0.1 to 1.0 mole per 100 moles of aromatic feed. Gas containing molecular oxygen is suitable for use in this invention as the oxidizing gas, preferred gases being air and oxygen-enriched air. The contact time is dependent on the reaction conditions (temperature and pressure) and may be varied over a wide range, for instance, about 0.01 to 10 hours. Normally the preferred contact time is from about 0.1 to 3 hours.

The preferred temperature for the oxidation of aromatic compounds is between about 175 and 250° C. The temperature range included within the scope of this invention is from about 150–300° C. The most desirable pressure range is from about 500 to 1000 p.s.i.g. The minimum pressure is the pressure required to maintain the liquid phase, whereas little is gained by employing pressures above above 1000 p.s.i.g.

In order to obtain the desired yields of the polycarboxylic acid esters and polycarboxylic acids in a high state of purity in accordance with the present invention it is necessary that the oxidation reaction be conducted in a medium which affects the solubilization of the reactants. More particularly the oxidation reaction is carried out in the presence of a solvent selected from the group consisting of acetic acid, substituted derivatives thereof, such as trichloroacetic acid, and water or mixtures of these materials. Although the use of water of acetic acid alone as the solvent is effective, it is particularly advantageous to use water or a combination with water; the water seemingly serving as an activator to assist in carrying the feedstock all the way to the most desired polycarboxylated compound, i.e., oxidizing all alkyl groups on the ring to carboxyl groups. Advantageously, when in admixture with the other solvents the water should be present in concentrations of at least about 10 percent by weight base on the aromatic feedstock with the upper concentration of the water being limited only by recovery problems. For example, the water can be present in amounts up to about 2000% or more, if desired. The total amount of solvent present in the system can vary over a wide range and is usually provided in amounts sufficient to solubilize a susbtantial amount of the organic acid ester feedstock and the catalyst. The amount of solvent will therefore depend on the choice of solvents and the solubility of the particular feedstocks in the solvent. Furthermore, the solvent need not be present in amounts sufficient to solubilize the entire charge of ester but enough solvent must be present to provide a sufficient amount of the ester in solution in order to effect the oxidation, with additional amounts of the acid being solubilized as the reaction products are formed. The quantity of solvent used for the reaction may frequently vary from about 10 to 95 weight percent of the charge to the reactor. The preferred charge contains about 50 to 90 weight percent solvent when acetic acid is used.

The following examples are used to demonstrate the usefulness of this invention and are not designed to limit the claims or processing procedures that could be used commercially. The experimental procedure described was used to prevent any trace metal contamination. A 120 ml. glass tube sealed at both ends was used on the inside of a 300 ml. shaker bomb. The tube contained a small hole in the top side for the introduction of oxygen-containing gas and also served in equalizing pressure within the bomb. The starting material, catalyst and solvent were charged to the glass tube. After closing the steel shaker bomb, an oxygen enriched gas (60% $O_2$–40% $N_2$) was introduced until a pressure of 300 p.s.i.g. was obtained. Heat was applied and the reaction controlled at this temperature until completed. At the end of this time the bomb was placed in cold water and after cooling to about 20° C. the contents of the tube were removed.

*Example I*

3 ml. methyl p-toluate, 0.16 ml. of an aqueous solution containing 46% HBr by weight, 14 g. $CH_3COOH$ and 4 g. water were charged to the bomb liner. After pressuring to 300 p.s.i.g. with the gas mixture, the bomb was held at 220° C. for 1.5 hours. After cooling 30% of toluic acid materials were recovered. 65.5% of the ester had been converted to phthalic acid and phthalic acid esters.

*Example II*

3 ml. methyl p-toluate, and 0.16 ml. 46% HBr solution were charged to the bomb liner with 18 g. glacial acetic acid, reacted and processed as in Example I. 67.5% conversion of toluate to phthalate esters and phthalic acid was obtained.

*Example III*

When 3 ml. methyl p-toluate was mixed with 18 g. glacial acetic acid and 0.25 g. of the conventional oxidation catalyst cobalt acetate, reaction with the gas of Example II under the same reaction conditions recited therein gave only a 15% conversion to phthalic acid and its esters.

It is thus apparent that toluic acid esters are readily responsive to oxidation by air and that an HBr catalyst serves to give far higher yields of polycarboxylated materials in this oxidation than conventional cobalt oxidation catalysts.

I claim:

1. A method for the preparation of benzene polycarboxylated compounds which comprises oxidizing in the presence of molecular oxygen and in the liquid phase an alkyl benzene carboxylic acid ester having at least one carbo-lower-alkoxy group and at least one nuclearly attached non-tertiary lower alkyl at a temperature of about 150 to 300° C. while in the presence of a catalyst consisting of hydrogen bromide and a solvent selected from the group consisting of water, acetic acid, and mixtures of the same.

2. The method of claim 1 wherein each alkyl has 1 to 4 carbon atoms.

3. A method for the preparation of benzene polycarboxylated compounds which comprises oxidizing in the presence of molecular oxygen and in the liquid phase an alkyl benzene carboxylic acid ester having only one carbo-lower-alkoxy group and only one nuclearly attached, non-teritary lower alkyl at a temperature of about 150 to 300° C. while in the presence of a catalyst consisting of hydrogen bromide and a solvent selected from the group consisting of water, acetic acid and mixtures of the same.

4. The method of claim 3 wherein each alkyl has 1 to 4 carbon atoms.

5. The method of claim 3 wherein the alkyl benzene carboxylic ester is methyl toluate.

6. The method of claim 5 where the temperature is about 175 to 250° C.

7. The method of claim 6 where the hydrogen bromide is present in an amount of about 0.1 to 1.0 mole per 100 moles of ester feed.

8. The method of claim 5 where the solvent is acetic acid.

9. The method of claim 8 where the acetic acid is present in the amount of about 50 to 90 weight percent of the ester and solvent.

References Cited in the file of this patent

UNITED STATES PATENTS

| | | |
|---|---|---|
| 2,415,800 | Rust et al. | Feb. 11, 1947 |
| 2,653,165 | Levine | Sept. 22, 1953 |
| 2,833,816 | Saffer et al. | May 6, 1958 |
| 2,853,514 | Brill | Sept. 23, 1958 |

OTHER REFERENCES

Barnett et al.: Ind. and Eng. Chem., vol. 41, pp. 2612–15, 1949.